United States Patent
Hecken

(10) Patent No.: US 8,657,055 B2
(45) Date of Patent: Feb. 25, 2014

(54) BATTERY ARRANGEMENT FOR AN ELECTRIC VEHICLE WITH A DIAMOND FRAME AND AUXILIARY PEDAL DRIVE

(75) Inventor: Michael Hecken, Biesenthal (DE)

(73) Assignee: Michael Hecken, Biesenthal (DE)

( * ) Notice: Subject to any disclaimer, the term of this patent is extended or adjusted under 35 U.S.C. 154(b) by 0 days.

(21) Appl. No.: 13/063,544

(22) PCT Filed: Sep. 10, 2009

(86) PCT No.: PCT/EP2009/006575
§ 371 (c)(1),
(2), (4) Date: Aug. 5, 2011

(87) PCT Pub. No.: WO2010/028829
PCT Pub. Date: Mar. 18, 2010

(65) Prior Publication Data
US 2011/0308871 A1    Dec. 22, 2011

(30) Foreign Application Priority Data

Sep. 12, 2008 (DE) .......................... 10 2008 047 087

(51) Int. Cl.
*B62M 6/90* (2010.01)
(52) U.S. Cl.
USPC ...................................... 180/207.3
(58) Field of Classification Search
USPC ............... 180/205.1–207.3, 220, 65.31, 68.5;
224/412, 413, 425, 426, 427
See application file for complete search history.

(56) References Cited

U.S. PATENT DOCUMENTS

| | | | | |
|---|---|---|---|---|
| 5,865,267 A | * | 2/1999 | Mayer et al. | 180/206.5 |
| 2005/0126840 A1 | * | 6/2005 | Lin | 180/205 |

FOREIGN PATENT DOCUMENTS

| | | | |
|---|---|---|---|
| BE | 1013281 A7 | 11/2001 |
| CH | 588375 A5 | 5/1977 |

(Continued)

OTHER PUBLICATIONS

English and German versions of the International Search Report dated Nov. 12, 2009 for PCT/EP2009/006575, 6 pages.

(Continued)

*Primary Examiner* — Tony Winner
(74) *Attorney, Agent, or Firm* — Edell, Shapiro & Finnan, LLC

(57) ABSTRACT

A vehicle comprising a frame, an electromotive drive and a control unit for controlling the electromotive drive. In a method for assembling an electric motorcycle in which at least one energy source is inserted into a frame. In order to ensure easy and quick assembly of the electric motorcycle, said motorcycle comprises an auxiliary pedal drive and the frame is designed as a diamond frame with at least one upper tube, at least one lower tube and at least one seat tube, wherein said upper tube comprises a receiving shaft for at least one energy source that includes at least one tube end with a push-in opening through which the energy source can be pushed into said receiving shaft. In the method according to the invention at least one energy source is inserted through an open tube end into an upper tube of said frame.

14 Claims, 6 Drawing Sheets

(56) References Cited

FOREIGN PATENT DOCUMENTS

| | | |
|---|---|---|
| CN | 2538653 Y | 3/2003 |
| CN | 201105785 Y | 8/2008 |
| DE | 2113968 A1 | 10/1971 |
| DE | 2629970 A1 | 1/1977 |
| DE | 3018333 A1 | 11/1980 |
| DE | 8101827 U1 | 8/1981 |
| DE | 9200524 U1 | 3/1992 |
| DE | 29921325 U1 | 3/2000 |
| DE | 69531904 T2 | 5/2004 |
| EP | 0675037 A1 | 10/1995 |
| GB | 2050270 A | 1/1981 |
| WO | 99/26837 A1 | 6/1999 |

OTHER PUBLICATIONS

German Search Report for German Application No. 10 2008 047 087.2, dated May 19, 2009, 4 pages.

* cited by examiner

BATTERY ARRANGEMENT FOR AN ELECTRIC VEHICLE WITH A DIAMOND FRAME AND AUXILIARY PEDAL DRIVE

The invention relates to an electric motorcycle with a frame, an electromotive drive and a control unit for controlling the electromotive drive.

The invention also relates to a method for assembling an electric motorcycle in which at least one energy source is inserted into a frame.

Principally, it is differentiated between electric bicycles and electric motorcycles. Electric bicycles comprise an auxiliary electromotive drive that merely serves to support a muscle-operated pedal drive. Usually, such an auxiliary electromotive drive of an electric bicycle will only be connected temporarily while the pedal drive is operated simultaneously.

On the other hand, electric motorcycles include an independent electromotive drive designed for continuous operation and with a performance allowing speeds of at least 45 km/h without any auxiliary pedal drive being required.

An electric bicycle comprising not only a pedal drive but also an auxiliary electric drive is described in the DE 2629970 A1. The motor is fixed to the seat tube and engages into a chain drive of the vehicle by means of a sprocket, said chain drive connecting a pedal-operated chain wheel to the drive sprocket provided at the rear wheel. Electric power is supplied to the motor via a battery provided behind the seat tube and above the rear wheel and cannot be operated, due to a control circuit, until the drive sprocket performs a rotating movement.

In case of the electric bicycle according to the DE 2113968 A1, batteries are provided on a platform for combining, as part of the frame, the front part of the vehicle including the handlebar and the front forks to the rear part of the vehicle including the seat and the rear forks. To stabilize the frame, a brace or bar has additionally been provided above said batteries to withstand bending moments acting between said front and said rear vehicle parts. The electric motor located in the rear wheel region is connected to the rear wheel via a two-stage belt-and-chain drives. The electromotive drive is controlled via an automatic switchgear assembly that is responsive to the vehicle's speed.

The DE 8101827 U1 describes an electric bicycle with connectable auxiliary motor drive, said bicycle being driven by two electric motors connected to the rear wheel via friction wheels. The bicycle frame comprises an upper, a lower and a seat tube, with an electric battery being provided in the region above a bottom bracket bearing between lower and seat tubes for driving the electric motor.

The frame of the electric bicycle as shown in the EP 0675037 B1 also comprises an upper, a lower and a seat tube, the upper tube being displaced towards the lower tube to make it easier to get on the bicycle. Electric motor and gear are directly mounted to the rear wheel axle and is supplied with power via a battery mounted on a carrier located above the rear wheel. The electric motor is controlled by means of a measuring device measuring the torque exerted to the rear axle via a pedal drive.

WO 99/26837 discloses an electric bicycle in which energy packs for an electric motor are pushed into the lower tube of a diamond frame either from the top or from the bottom. Such a solution is disadvantageous in that it requires structural changes of the frame, particularly in the bottom bracket bearing region, thereby affecting the power and torque flow within the frame.

The DE 30 18 333 reveals an electric bicycle with an auxiliary electric drive. As can be learned from the drawings, the diamond frame is equipped, via the handle tube and the seat tube, with accumulators as well as with an electric motor and a reduction gear. Such an assembly is cumbersome and labor intensive.

Electric motorcycles as known from the state of the art offer noticeably higher driving speeds above 45 km/h and a wattage of distinctly more than 1 kW. Due to their high performances and speeds, prior art electric motorcycles a commonly provided with motorcycle frames. Because of the great number of accumulators required for such performance and the more stable construction thereof, electric motorcycles are very heavy, generally weighing more than 70 kg. Pedal drives are not common for electric motorcycles, as their heavy weight can only be handled at high speeds and makes it particularly difficult to climb a mountain by means of muscular strength. Another disadvantage of prior art electric motorcycles is in that any transportation thereof is very difficult, as a single person is not able to carry or take it along in public transportation means, due to the weight and the structure thereof.

Accordingly, it is the object of the invention to reach the performance characteristics of an electric motorcycle by the simplest means and frame structures.

For the above-mentioned electric motorcycle, the invention solves this task in that the upper tube is provided at least one tube end with a push-in opening through which the energy source can be pushed into the receiving shaft.

The energy source has been designed either in the form of an energy-storing element, or as a module that can be handled in one piece and is assembled of a plurality of energy-storing elements. Preferably, the energy source stores electric power and can, for example, comprise one or more accumulators. Alternatively, said energy source can comprise at least one energy storage, for example a tank for storing hydrogen or methanol, or at least one converter, for example a fuel cell for generating electric power.

The electric motor cycle according to the invention has the advantage that energy sources for supplying the electromotive drive with electric energy, such as batteries or accumulators, can be incorporated into the upper tube. Such incorporation of energy sources into the upper tube makes it possible that the advantages of a diamond frame can be maintained. Moreover, it works without additional retainers or supports for energy sources so that the overall weight of the electric motorcycle at a performance of more than 1 kW and a maximum speed of more than 80 km/h is reduced considerably. Due to the push-in opening provided at least one end, the receiving shaft incorporated into the upper tube is readily accessible even if the electric motorcycle is in an assembled state. There is no need for any additional support for mounting energy sources to the frame, thus saving mounting costs, material and space. The upper tube can entirely be filled up with one or more energy sources so that a closure provided at the push-in opening will do to fix the energy sources in the receiving shaft.

To obtain low weight and high stability, the frame of the inventive electric motorcycle is designed as a diamond frame. A diamond frame consists of a triangle comprising a seat bar, a rear bar and a seat tube, as well as a trapezoid formed of the upper tube, the seat tube, the lower tube and the control tube.

Particularly in combination with the supplemental, muscle-operated auxiliary pedal drive are the dimensions of the inventive diamond frame advantageous. The frame design of the inventive electric motorcycle in form of a diamond frame allows for ergonomic dimensions to operate the auxiliary pedal drive, along with simultaneous high strength which enables maximum speeds of at least 89 km/h. As the energy sources are incorporated into the frame, there is a high energy capacity available with the electric motorcycle being of low weight.

According to another preferred embodiment of the inventive electric motorcycle, the push-in opening can pass through the seat tube. If the frame is, for example, in the form of a diamond frame there is an externally accessible opening in the upper tube that can be filled up with energy sources with only little mounting efforts being required. Also in case of an entirely assembled electric motorcycle, such push-in opening is easily accessible so that defective or exhausted energy sources can be replaced with ease.

To simplify the insertion of energy sources into the upper tube and to increase the frame stability, said upper tube may continue on opposite sides of the seat tube. Thus, the rim of the push-in opening is supported by the wall of the upper tube. At the same time, the extension of the upper tube surrounding the push-in opening serves as guidance for the energy sources to be inserted into the receiving shaft of said upper tube.

In still another preferred embodiment the seat tube may comprise another receiving shaft for at least one energy source, said shaft intersecting the receiving shaft of the upper tube and being provided at one tube end with a push-in opening to receive energy sources therein. The advantage of such an additional push-in opening is in that the hollow space of the seat tube can also be used as receiving shaft for energy sources so that more energy sources are available without more space being required.

The seat tube may comprise a receiving means for a saddle tube or a saddle bar onto which a saddle or seat for the driver is mounted. The saddle tube can be movably received in the seat tube, such receiving means including, for example, a clamping element for locking the saddle tube in the seat tube. The receiving means for the saddle tube can simultaneously be used as push-in opening to fill up the seat tube with energy sources, the inner diameter of said receiving means for said saddle tube preferably corresponding to the inner diameter of said seat tube. The seat tube can entirely be filled up with energy sources before the saddle tube is mounted.

The saddle tube can be an extension of the receiving shaft of the seat tube. If, for example, the saddle tube is connected to the seat tube via a socket there is an interruption-free, common receiving shaft for saddle and seat tube that can entirely be filled up with energy sources. Such energy sources may, for example, be accumulators that are combined to rod-shaped packs. A predetermined number of accumulator packs to be inserted into the seat tube may be of a length larger than the length of the receiving shaft formed by the seat tube. Thus, after having filled up the seat tube, the energy sources protrude from the seat tube. That portion of the energy sources protruding from the seat tube will be accommodated in the saddle tube inserted into the seat tube, the hollow space thereof serving as receiving shaft thus allowing for a further increase of the energy capacity.

As the frame tubes surround the receiving shafts, the energy sources will be protected from damages due to accidents or shocks. To improve protection of the energy sources, the receiving shafts can be lined with a dampening material. In order to obtain not only a dampening effect but also a damp-proof protection for the energy sources, chloroprene rubber, e.g. neoprene, can preferably be used for lining the receiving shafts.

According to still another preferred embodiment, said upper tube, said seat tube and/or said lower tube may comprise a receiving shaft for at least one energy source, the inner contour thereof being formed by the wall of said upper tube, said seat tube and/or said lower tube, in order to design the receiving shafts in weight- and material-saving manner.

To obtain an optimal packing density of the energy sources within the receiving shaft, the receiving shaft of said seat tube and/or of said upper tube and/or of said lower tube as well as the energy sources may be of at least roughly circular cross-section. Especially the circular cross-section or the circular contour of the energy source may be of approximately the same cross-section as the receiving shaft so that the energy source fills up the receiving shaft to the greatest extent and is fixed, in assembled state, transversely to the respective frame tube.

To assemble a control unit for controlling the motor in cost- and space-saving manner, said upper, said lower or said seat tube may include an opening in their lateral surface into which said control unit is repeatedly inserted in detachable manner. The control unit can be connected by a cover to a mounting unit or to a control module by which said opening can be closed.

According to an embodiment representing also independently of the above solution an independent invention, said mounting unit including said control unit and said cover for said lateral surface opening may comprise still further electric motorcycle elements that can be assembled into the frame together with the cover in one mounting step. For example, such mounting unit can be provided with a power connection for charging accumulators serving as energy sources, an overload or overheat cut-off, a key switch for activating said control unit, a horn, a break conduit connection, a switchgear control, and/or a control line for connecting the control to said control unit.

The cover or the control module can be connected on said lateral surface opening to the respective frame tube, particularly via connecting elements that can be closed again, thus making it easier to remove the control unit for maintenance work or for vehicle recycling. Such connecting elements may, for example, be designed in the form of screws or of snap connectors. If there is a force-fit connection between the cover and the corresponding frame tube, a sealing lip surrounding said lateral surface opening can be provided at said cover or at said frame tube. To facilitate a watertight sealing of the cover same may alternately also be pasted, welded or soldered to said opening.

The control unit can be used to control the energy supplied to the electric motor. Accordingly, a power loss might occur in said control unit resulting in an intense heating of the control unit. To avoid overheating of the control unit due to the heat loss, said cover or said module including said control unit and said cover may comprise cooling areas or surfaces that are connected to the control unit via a thermal bridge. The cooling areas can be provided at the side of the cover opposite to the control unit so that, in assembled state of the control unit, same are arranged outside of the upper, the lower or the seat tube. To obtain an optimal cooling effect, said cooling areas can be provided in a region where they are exposed to the airstream.

According to still another preferred embodiment of the inventive electric motorcycle, said lateral surface opening can be designed in such a manner that energy sources can be inserted through said opening into said upper, lower or seat tubes. The module comprising said control unit and said cover can preferably be arranged at said lower tube so that not only said upper tube and said seat tube but also said lower tube can be filled up with energy sources.

To obtain an electric motorcycle of utmost low overall weight, the frame can be an aluminum frame, said upper, lower and seat tubes having a wall thickness of at least 2 mm and/or an outer diameter of at least 64 mm. Thus, a distinct increase in the stability of the frame with simultaneous low weight can be reached. A frame tube having a lateral surface opening for receiving a control module may be of an enlarged outer diameter of at least 70 mm, in order to again increase the stability that was reduced due to such opening.

Due to the enlarged tube diameter of the upper, seat and/or lower tube that is clearly larger than the tube diameter of conventional bicycle frames, the low-weight frame according to the invention is of a strength, even when designed as diamond frame, that permits a safe driving at driving speeds of more than 80 km/h.

At the same time, the volume of the receiving shafts is enlarged due to the great inner diameter of the frame tubes so that more energy sources can be accommodated to increase the total power and capacity available. Thus, not only a fast driving speed but also a large cruising radius of the electric motorcycle has become possible distinctly exceeding the common cruising radii of electromotive drives of bicycles with auxiliary motor. The inventive electric motorcycle can exclusively and permanently be driven only by said electromotive drive. Any additional mechanical drive, for example a muscle-operated pedal drive, may be used as auxiliary drive in order to increase the cruising radius of the vehicle.

Accordingly, due to its simple design, the inventive electric motorcycle is as easy to handle and to transport as a bicycle, but offers, owing to the high strength of the frame and of the large volume available to receive energy sources therein, also speeds and cruising radii that have so far been withheld to electrically driven motorcycles.

According to an embodiment representing an independent invention quite independently of the above-mentioned solution, the lateral surface opening can also be closed by means of a cover, said cover, when the electric motorcycle is running, guiding via supporting surfaces at least a portion of the force flux arising within the frame due to external forces. Said supporting surfaces can, for example, be formed as an extension protruding into said lateral surface opening and resting on the circumference of said opening. Further, the cover can rest in flat manner on the frame tube in those regions of the corresponding frame tube adjacent to the lateral surface opening so that there is an optimal pressure distribution. The cover can, at least section-wise, encompass the frame tube. From the center to the margin thereof, the cover may comprise a continuously narrowed cross-section so that any discontinuity of stiffness caused by said cover can be reduced and any occurring stress tensions be avoided.

To reinforce the frame tube in the region of said lateral surface opening, said opening may alternately or additionally be provided with a support frame so as to increase the wall thickness of said frame tube in the region of said opening. The frame may comprise recesses or protrusions so as to enlarge the heat-emitting surface area and thus dissipate heat losses resulting in the control module much better.

For the above-mentioned method said object is solved in that at least one energy source is inserted at an open tube end into an upper tube of the frame. Said upper tube is equally used as a receiving shaft and as guidance for mounting one or more energy sources. Thus, the inventive method has the advantage that no additional retainers for energy sources have to be mounted.

The seat tube can be filled up with energy sources through a push-in opening for receiving the saddle tube. Said push-in opening through which the seat tube is filled up with energy sources thus corresponds to the receiving means through which said saddle tube is inserted. Accordingly, the saddle tube can also be filled up with energy sources, without any additional closure for fastening said energy sources being required.

The lower tube can be filled up with energy sources through a lateral surface opening located between the ends thereof. Filling through such an opening has the advantage that the lower tube can be filled up with energy sources even after a firmly bonded frame mounting.

According to another preferred method step, a control unit can be inserted into a lateral surface opening of said upper, lower or seat tubes and said opening can be closed by a cover, the force flux being guided, under operation, at least partially through said cover.

In order to enhance the cruising radius of the electric motorcycle or to enable driving of the electric motorcycle also with discharged or exhausted energy sources, a muscle-operated mechanical drive means can be provided. Same might comprise, for example, a chain or a belt drive for connecting a pedal-driven shaft to the drive axle of said electric motorcycle. Alternatively, a universal shaft can be provided for connecting a pedal-driven bottom-bracket bearing to the drive axle.

In the following, the invention will exemplarily be explained by means of different embodiments with respect to the drawings. The described embodiments are just conceivable developments that can be modified for corresponding cases of application. Individual features that are advantageous per se may, according to the above description of the preferred developments, be added to or omitted from the described embodiment, respectively.

Figure 1:
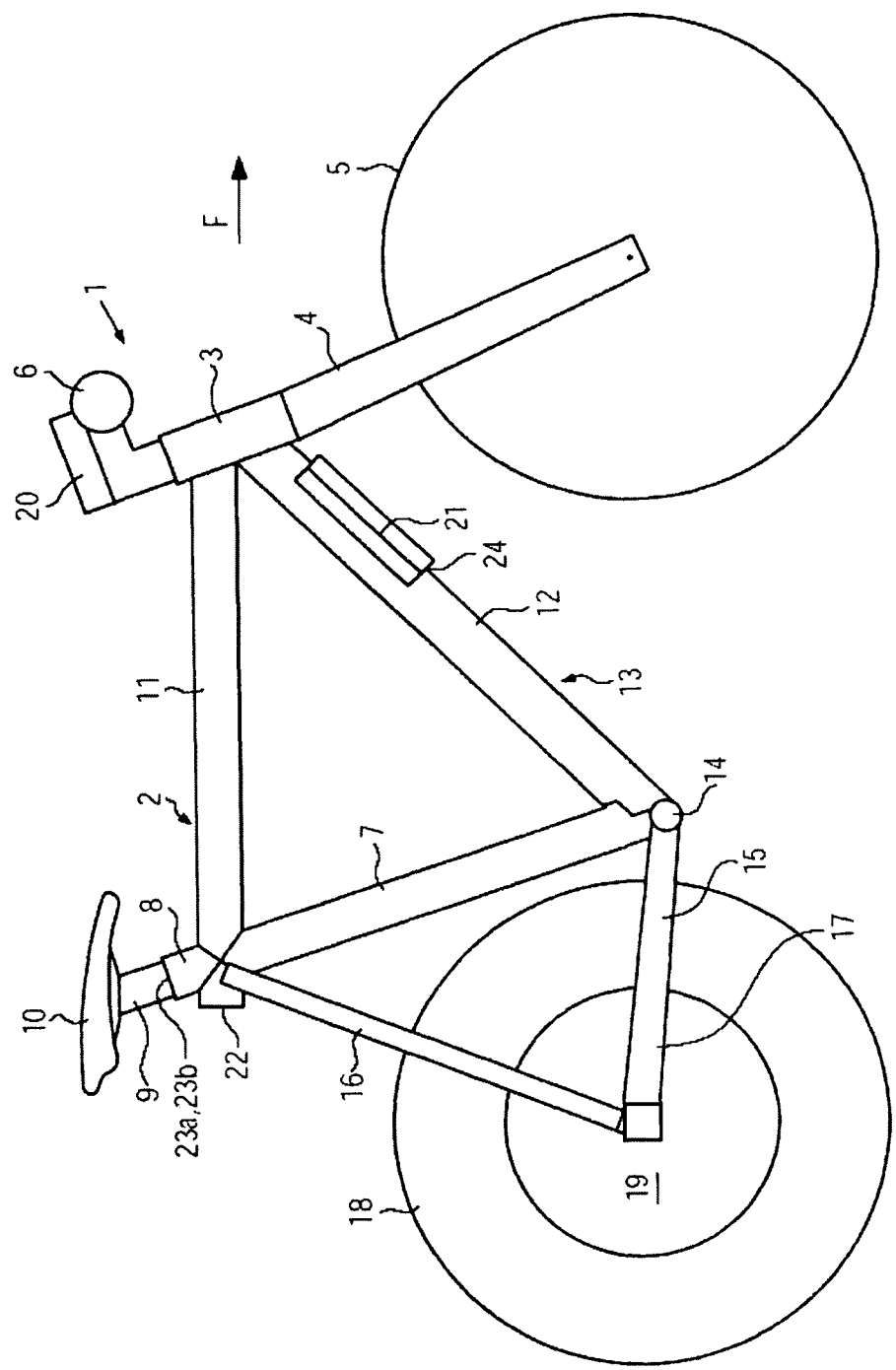
FIG. 1 is a schematic illustration of a first embodiment of the invention.

First, the structure of an inventive vehicle will be described with regard to the embodiment according to FIG. 1. The electric motorcycle 1 comprises a frame 2 designed as a diamond frame 2 and forming a supporting structure for all other components of the electric motorcycle. In a head or steering tube 3 a front wheel suspension 4 is pivoted so that a front wheel 5 pivotally connected to front wheel suspension 4 can be deflected by means of a handlebar 6.

A seat tube 7 includes at its upper end a receiving means 8 for a saddle tube 9. Saddle tube 9 is accommodated in said seat tube 7 in sliding manner and locked via a clamping element (not shown) combining said saddle tube 9 in force-fit manner with said seat tube 7. At its upper end, saddle tube 9 is combined with a saddle 10. The seat tube 7, the steering or head tube 3, an upper tube 11 and a lower tube 12 together form a base frame 13. At a junction point 14 where said lower tube 12 and said seat tube 7 come together, two chain stays 15 arranged in tandem-form are fixed in form-fit and firmly bonded manner. Each of said two chain stays 15 forms a triangle, together with a seat stay 16 and said seat tube 7. Both triangles arranged in tandem-form and comprising said seat tube 7, said chain stays 15 as well as said seat stays 16 form a fork-like rear wheel suspension 17 into which a rear wheel 18 has been inserted in a rotatable manner.

In the region of its rotation axis or its hub, rear wheel 18 is provided with an electromotive drive 19 in the form of a hub motor 19 used to transmit a driving torque to said rear wheel 18 by means of a torque support (not shown). Alternatively or additionally, the front wheel 5 may also be provided with a hub motor 19. Hub motor 19 will be supplied with power by accumulators accommodated in said base frame 13. The output of hub motor 19 can be set via an operating module 20 so as to control the voltage transmitted to hub motor 19 via a control module 21 mounted at or in said lower tube 12.

The base frame 13 can entirely be filled up with energy sources, for example in form of accumulators, as each of said frames 7, 11, 12 of said base frame 13 has push-in openings 22, 23a, 24 through which said accumulators can be inserted. Push-in opening 22 located at an end of upper tube 11 directing opposite to a driving direction F is arranged at one end of a receiving shaft encompassed by said upper tube 11, said shaft running through seat tube 7 so that, at least with the saddle 9 not being mounted, energy sources can be pushed into said upper tube 11 through said push-in opening 22. To facilitate such insertion of energy sources into upper tube 11 and to enhance the stability of frame 2, said upper tube 11 continues at opposite sides of said seat tube 7. Thus, the wall of upper tube 11 supports the rim of push-in opening 22. At the same time, the upper tube 11 extension surrounding push-in opening 22 is used as guidance for the energy sources to be inserted into the receiving shaft (not yet shown) of said upper tube 11. The energy sources (not yet shown) are accommodated in a receiving shaft of said upper tube 11, said shaft being formed of at least one portion of said upper tube 11. Alternatively or additionally, the head or steering tube 3 may comprise a push-in opening that is in alignment with the receiving shaft of said upper tube 11 into which, at least with the front wheel suspension 4 not being mounted, energy sources can be pushed.

At the same time, the push-in opening 23a of seat tube 7 serves as a receiving means 23b for saddle tube 9 that is mounted therein, for example through a force-fit clamped connection and/or a form-fit connection. Push-in opening 23a through which said seat tube 7 is filled up with energy sources thus corresponds to receiving means 23b through which the saddle tube is received. Consequently, energy sources can be pushed into the seat tube through said push-in opening 23a with the saddle tube 9 being dismounted.

Push-in opening 24 formed by a lateral surface opening 24 of said lower tube 12 is closed by means of control module 21 comprising a control unit and a cover. During the assembly of the electric motorcycle 1, energy sources can be inserted through said opening 24 into said lower tube 12 before said control module 21 is mounted.

Figure 2:
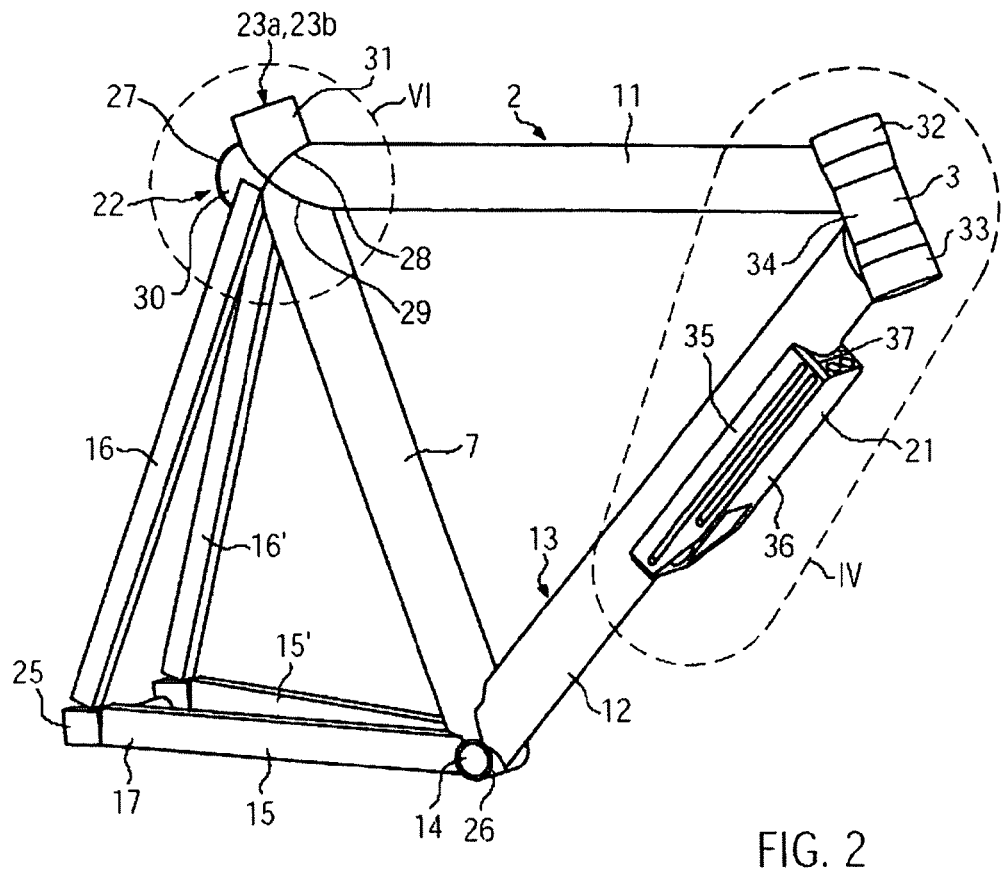
FIG. 2 is a schematic perspective view of a vehicle frame according to the invention.

FIG. 2 shows another embodiment of an inventive electric motorcycle, with the elements corresponding as to function and structure to those elements of the embodiment according to FIG. 1 being given the same reference signs. For brevity, it is hereby referred to the differences over the embodiment according to FIG. 1.

Seat stays 16, 16' are firmly bonded, for example by soldering or welding, to upper tube 11 and run apart towards a rear axle 25 arranged in said rear wheel suspension 17. Chain stays 15, 15' are firmly bonded connected to said seat tube 7 and said junction point 14 and have, just as seat stays 16, 16', a distance increasing towards rear axle 25.

Junction point 14 is provided with an inner bearing bushing 26 for bearing a foot pedal-driven shaft in order to drive the rear wheel by means of a traction drive, e.g. a belt or chain drive.

The push-in opening 22 of upper tube 11 is formed of the tube end 30 of said upper tube 11 that is put on saddle tube 7 as a protrusion 30. Push-in opening 22 is closed by a seal 27 thereby preventing that dirt or humidity may come into the receiving shaft of said upper tube 11 or of said saddle tube 7. Such seal may be inserted into or onto said push-in opening 22 in form-fit manner, e.g. by means of a thread or a snap lock, or in force-fit or friction-locked manner.

At a wall thickness of at least 2 mm, said seat tube 7 and said upper tube 11 are of roughly the same outer diameter, viz. 64 mm. Both tubes 7, 11 are made of aluminum and combined with each other through weld seams 28, 29. Due to the same outer diameters of said frame tubes 7, 11, said weld seams 28, 29 form a symmetric cross. When energy sources are inserted into push-in opening 22, tube end 30 of upper tube 11 protruding from said base frame 13 serves as a guidance and provides, besides, supporting faces for the firmly bonded connection of said seat stays 16, 16', whereas the tube end 31 protruding from said base frame 13 serves as friction- and/or form-fit connection of the saddle tube (not shown here).

Preferably, steering tube 3 is cut out of aluminum and is of a different outer diameter with regard to frame tubes 7, 11, 12. For example, both tube ends 32, 33 have enlarged diameters, each of which decreasing towards the center region 34 of said steering tube 3. The broadened tube ends 32, 33 have enlarged inner diameters, thus enabling the use of larger steering head bearings.

Lower tube 12 is firmly bonded to steering tube 3 and seat tube 7 and has a wall thickness of 2 mm and an outer diameter of 70 mm. Owing to the enlarged tube diameters of upper tube 11, seat tube 7 and/or lower tube 12, the inventive frame 2 has a low weight and a strength that makes safe driving at driving speeds of more than 80 km/h possible. Hence follows that the electric motorcycle 1 can also be used on streets that are intended for motor vehicles. At the same time, the volume of the receiving shafts could have been enhanced due to the large inner diameters of said frame tubes 7, 11, 12 so that it has become possible to accommodate more energy sources, in order to increase the overall performance and capacity available.

Lower tube 12 is provided with the control module 21. Control module 21 comprises a two-part casing including the retaining frame 35 connected to said lower tube 12, as well as a cover 36. Retaining frame 35 preferably cut from aluminum has a concavely shaped recess 37, the contour thereof corresponding to the lateral surface of lower tube 12. Thus, during the assemblage, said retaining frame 35 of said control module 21 preferably firmly bonded to lower tube 12 by welding can be flat-positioned onto the lateral surface of said lower tube 12, in order to facilitate a precisely fitting welded joint between retaining frame 35 and lower tube 12. When the electric motorcycle 1 is running, retaining frame 35 supports lower tube 12 as at least a portion of the force flux introduced into the lower tube 12 by bending moments, tensile forces or compressive forces is guided through said retaining frame 35.

Figure 3:
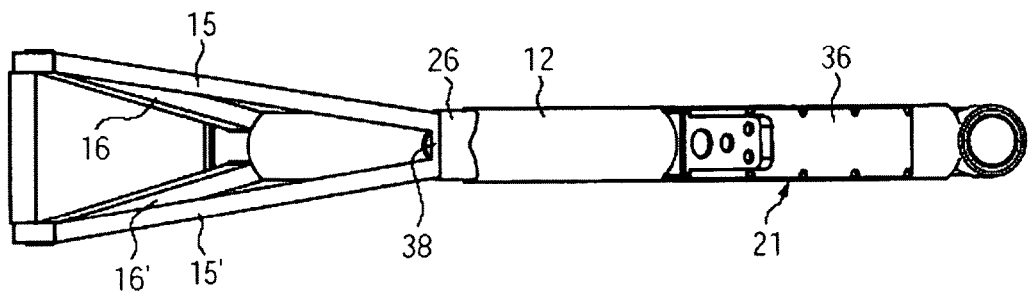
FIG. 3 is a schematic bottom view of the vehicle frame of FIG. 2.

FIG. 3 shows a bottom view of the electric motorcycle frame according to FIG. 2. The chain stays 15, 15' are connected to each other via a crossbar 38 abutting to the inner bearing bushing 26 and being connected thereto in firmly bonded manner, e.g. by welding. Said crossbar 38 and the sections of said chain stays 15, 15' abutting thereto can be made in one piece by cutting or milling. Thus, said crossbar 38 and the sections of said chain stays 15, 15' form a substantially U-shaped component used to derive tensions in the region of the inner bearing bushing 26 while the electric motorcycle is running and/or to avoid any force flux concentrations in the adjacent weld seams. Owing to the insertion of a U-shaped component encompassing said crossbar 38 into the region of said chain stays 15, 15' adjacent to the inner bearing bushing 26 it is thus possible to obtain an increased strength or stiffness of frame 2.

The cover 36 of control module 21 is of the same width as lower tube 12 and does, for this reason, not project beyond lower tube 12 in the illustrated bottom view. Accordingly, in case the electric motorcycle 1 falls to the ground it is less possible that the control module 21 lies on the ground and can be damaged.

Figure 4:
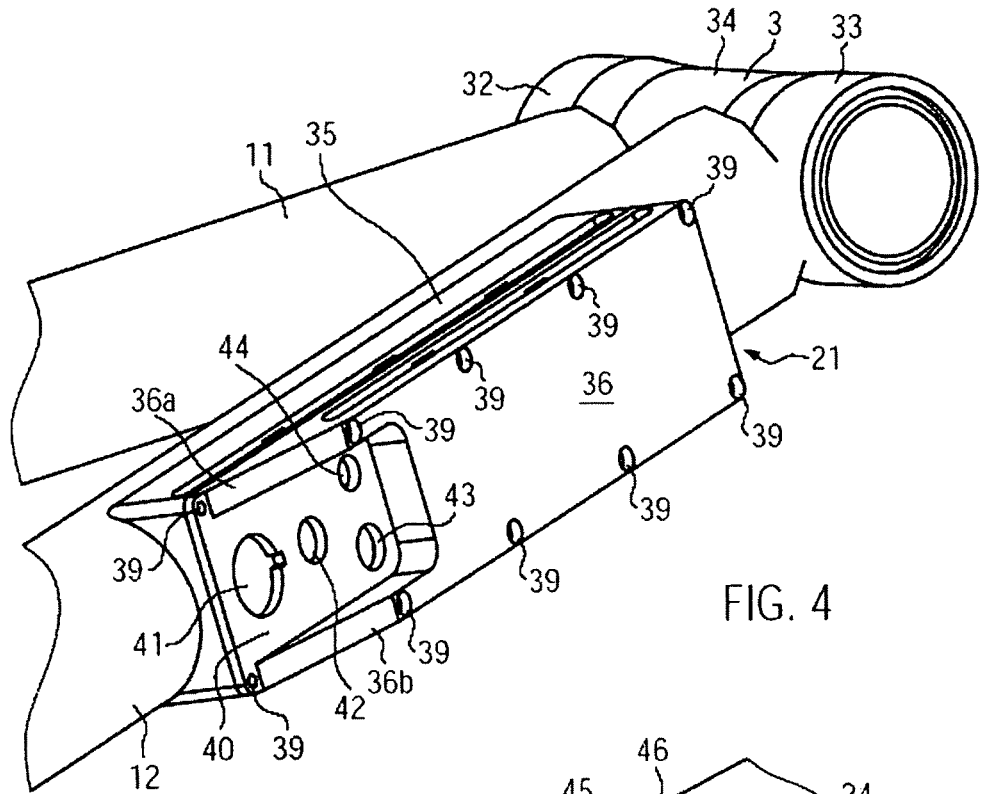
FIG. 4 is an enlarged, rotated, schematic perspective view of section IV of FIG. 2.

FIG. 4 illustrates an enlarged, rotated perspective view of section IV according to FIG. 2. Cover 36 of control module 21 includes holes 39 aligning with holes (not shown) in the retaining frame 35. Said holes in said retaining frame 35 are threaded so that the cover 36 can be connected to retaining frame 35 via screws inserted into said holes 39. The screw connection of said cover 36 forms a repeatedly detachable connection of said control module 21 with said lower tube 12, thus allowing control unit maintenance work, replacement of energy sources located in said lower tube 12, as well as a simplified recycling of the components provided in said lower tube 12.

The cover 36 is provided with a recess 40 with four connection holes 41, 42, 43, 44. Said connection holes 41 to 44 are used to receive a circuit breaker, a key switch, a charging current connector, as well as a horn. With the exception of the region near said recess 40, cover 36 preferably made of aluminum has a wall thickness of more than 10 mm so that the heat-storing volume and the heat-emitting area of the cover 36 is enlarged. The heat-emitting area has additionally been enlarged by two fin-like extensions 36a, 36b, both extending at both sides of recess 40 towards the inner bearing bushing.

Retaining frame 35 clinging to the lateral surface of lower tube 12 does not only accommodate said control unit but also stiffens said lower tube 12. In the region of lower tube 12 hidden by said retaining frame 35 there is preferably provided a recess for accommodating at least one portion of control module 21. Strength and bending stiffness of lower tube 12 could have been enhanced by said retaining frame put on said lower tube 12 in form-fit manner, irrespective of the lateral surface opening 24 for accommodating said control module 21.

Figure 5:
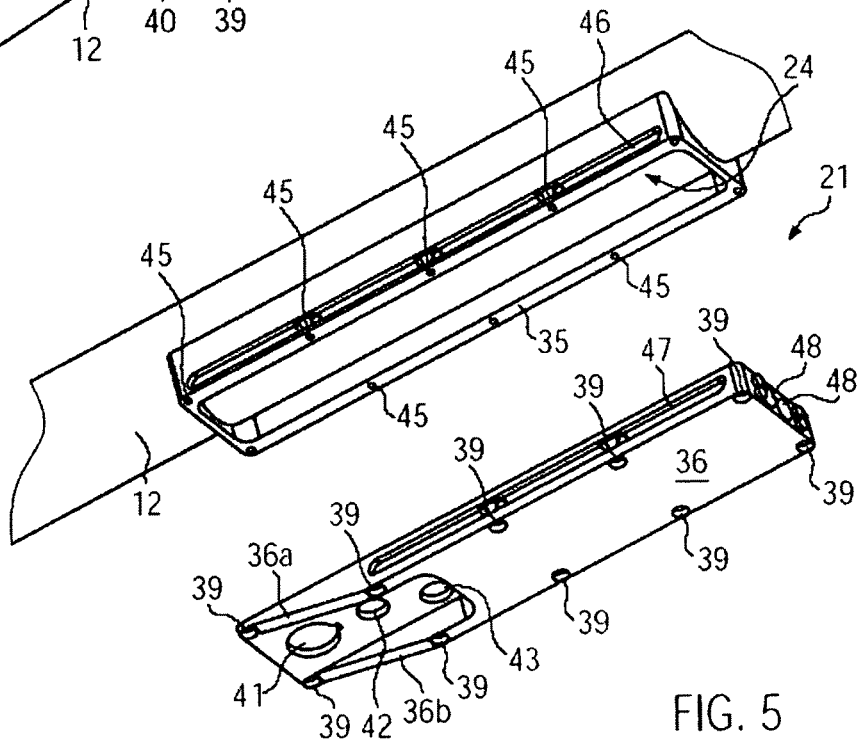
FIG. 5 is a schematic explosive view of the housing for the control unit shown in FIG. 4.

FIG. 5 illustrates a schematic explosive view of control module 21. The retaining frame 35 encompasses said lateral surface opening 24 of said lower tube 12 serving as push-in opening for energy sources. Retaining frame 35 is provided with ten threaded holes 45 into which screws can be screwed inserted in holes 39 of said cover 36, and is further provided on both longitudinal sides thereof with recesses 46 extending towards the longitudinal extension of frame 35 and being interrupted only in the region of said holes 45 by pedestal-like protrusions. The cover 36 also has holes 47 at both longitudinal sides, said holes extending parallel to said recesses 46 and also being interrupted only in the region of said holes 39 by protrusions surrounding said holes 39. Recesses 46, 47 or grooves 46, 47 in said cover 36 or said retaining frame 35 enhance the heat-emitting area of said control module, thereby improving cooling of the electronics included in said control unit 21.

At its end directing towards steering tube 3 cover 36 is provided with openings 48 for guiding control lines, brake lines and/or power supply lines to connect said control module 21 to an operator control module 20 or indicators or lights provided at the handlebar to said control module.

Figure 6:
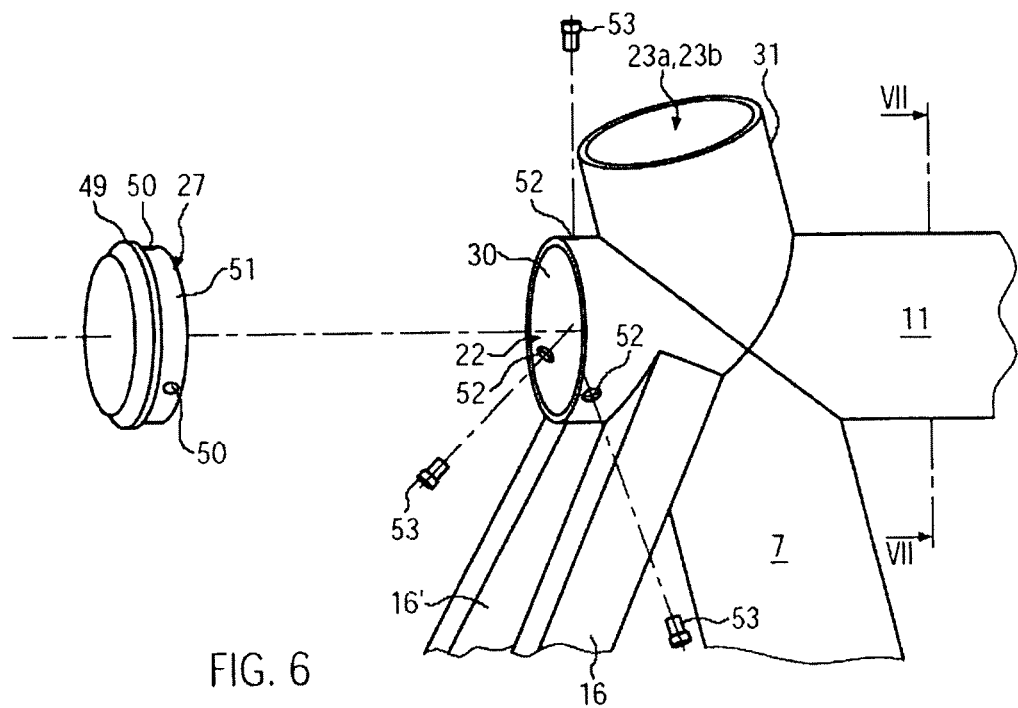
FIG. 6 is an enlarged schematic perspective view of section VI of FIG. 2.

FIG. 6 illustrates section VI of FIG. 2 in an enlarged perspective explosive view. Push-in opening 22 at tube end 30 is closed by a seal 27. Seal 27 provides for a safe accommodation of said energy sources in upper tube 11 and prevents that dirt and humidity can come into the receiving shaft of upper tube 11.

With the seal 27 being inserted, a protrusion 49 of said seal 27 rests upon the rim of tube end 30, thus determining the horizontal position of seal 49. Holes 50 provided in the cylindrical section 51 of seal 27 inserted into tube end 30 are aligned to radial holes 52 provided in said tube end 30. Connecting elements 53 radially inserted from outside into holes 52 are provided in said holes 50 of said cover 27 and provide for a firm seat of the cover 27 at tube end 30. Connecting elements 53 can, for example, establish a force-fit connection in form of rivets and dowels with said seal 27 and said tube end 30, or can be designed as screws so as to facilitate repeated opening of the seal 27. Alternatively, seal 27 may be provided at protrusion 51 with an external thread that fits into a corresponding internal thread provided at tube end 30 so that seal 27 can be screwed into tube end 30.

Figure 7:
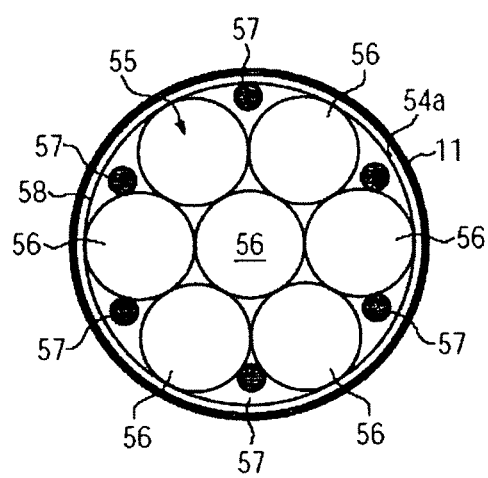
FIG. 7 is a schematic sectional view at VII-VII of FIG. 6.

FIG. 7 illustrates a sectional view at VII-VII of FIG. 6. An energy source 55 is located in a receiving shaft 54a formed by said upper tube 11, said energy source supplying the electric drive with electric energy. Energy sources 55 include accumulators 56 arranged such that the circular cross-section of upper tube 11 has been filled up optimally. Connection cables 57 are provided between said accumulators 56 for combining said accumulators to said control module. Energy source 55 in the form of an accumulator packet 55 comprises a sleeve 58 forming a circular contour together with said accumulators 56 embedded into said sleeve 58 and said connection cables 57. Owing to the circular contour of said accumulator packet 55, the receiving shaft of upper tube 11 that is also of circular cross-section is filled up optimally.

Figure 8:
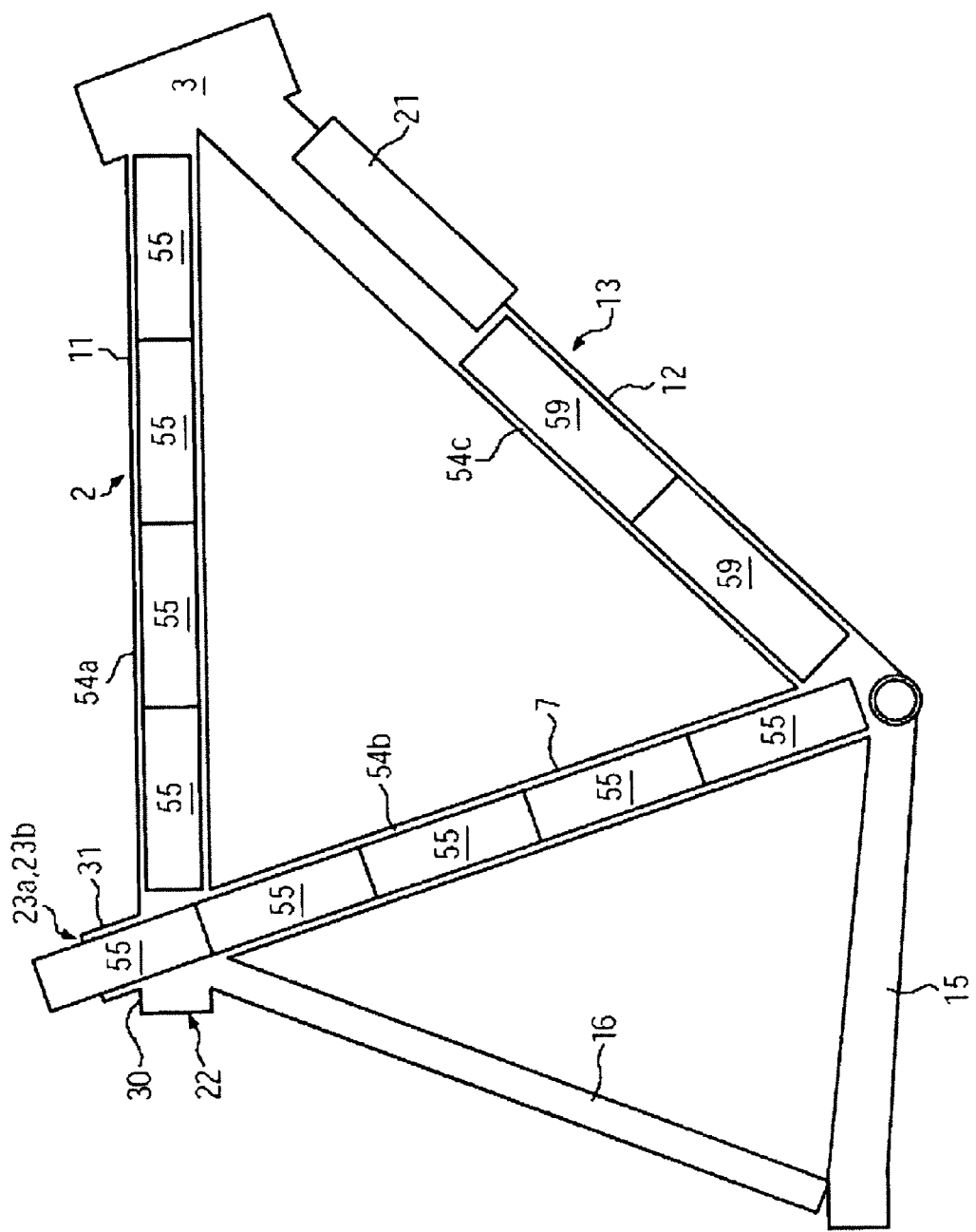
FIG. 8 is a schematic sectional view of another embodiment of the inventive vehicle frame.

FIG. 8 illustrates a sectional view of an inventive electric motorcycle frame 2. Receiving shafts 54a, 54b, 54c are provided in seat tube 7, lower tube 12 and upper tube 11, each being filled up with energy sources 55, 59 so that almost the overall hollow space volume available of the basic frame 13 comprising seat tube 7, lower tube 12, upper tube 11 and steering tube 3 has been filled up with energy sources 55. The energy sources 59 located in lower tube 12 are, corresponding to the larger inner diameter of lower tube 12, of a greater outer diameter. During the assembly, energy sources 59 are inserted into receiving shaft 54c formed by lower tube 12 through lateral surface opening 24 closed by said control module 21. Energy sources 55 located in receiving shaft 54a of upper tube 11 enter the upper tube 11 through push-in opening 22. Receiving shaft 54a of upper tube 11 continues up to the tube end 30 or to push-in opening 22, but is only filled up with energy sources between steering tube 3 and seat tube 7, to fill up saddle tube 7 beyond tube end 30 with energy sources 55. The energy sources 55 inserted into seat tube 7 are pushed into seat tube 7 through push-in opening 23a provided at tube end 31.

Energy source 55 located in the region of upper tube 11 in seat tube 7 protrudes, after filling, from push-in opening 23a of seat tube 7. Said protruding section of energy source 55 will be received from the saddle tube when a saddle tube 9 with an inner diameter larger than the outer diameter of an energy source 55 is pushed in.

All receiving shafts 54a, 54b, 54c may be lined with a resilient, shock-absorbing inner lining, such as neoprene, so as to avoid damages on energy sources 55, 59 caused by shocks. Such inner lining may be flexibly deformed by said energy sources 55, 59 in a radial direction to the corresponding tubes 7, 11,12 to form a friction-fit support of said energy sources 55, 59 in said receiving shafts 54a, 54b, 54c by means of the surface pressure between energy sources 55, 59 and lining.

Figure 9:
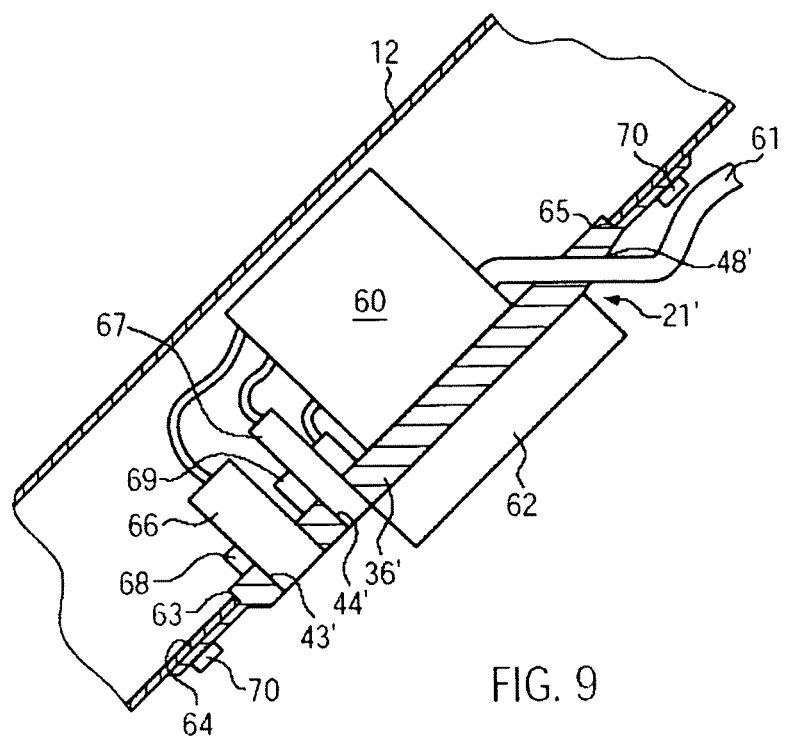
FIG. 9 is an enlarged sectional view of a frame tube with integrated control module.

FIG. 9 illustrates another embodiment of an inventive control module 21' that is inserted into lower tube 12. Contrary to control module 21 of FIGS. 4 and 5, said control module 21' does not include a retaining frame 35. A control unit 60 is directly mounted to the cover 36'. At its outer side, said cover 36' is provided with cooling areas 61 in the form of cooling fins 61 by which the heat-emitting area of said cover 36' and thus the cooling of control unit 60 can be improved. Control unit 60 is connected through a control line 61 to an operator module 20 mounted to the steering. Cover 36' comprises supporting areas 63 and 64 that cling to the wall of lower tube 12 and transmit at least a portion of the force flux conducted through said lower tube 12. Supporting area 63 abuts to the rim of a lateral surface opening 65, whereas supporting area 64 directly rests on the lateral surface. Supporting area 64 has a curvature that corresponds to the curvature of the lateral surface of lower tube 12. The cover includes connection holes 43', 44' into which further components are inserted used for the connection to said control module 21. Inserted into connection hole 43' is a power connection to which an external energy source can be connected so that the energy sources 55, 59 in the form of accumulator packs 55, 59 inserted into said receiving shafts 54a, 54b, 54c of frame tube 7 can be charged.

A circuit breaker 67 inserted into connection hole 44 interrupts the power supply from said energy sources when there is the danger of thermal overload of said control module 21', or of excess voltage. Further connection holes (not shown) accommodate a key switch 68 and a horn 69.

Control module 21' is connected to lower tube 12 via connecting elements 70 in form-fit and/or force-fit manner. Connecting elements 70 may either be designed as screws 70 or as rivets 70. Alternatively, control module 21' may be mounted in form-fit manner through snap-locks or pipe clamps encompassing lower tube 12.

Figure 10:
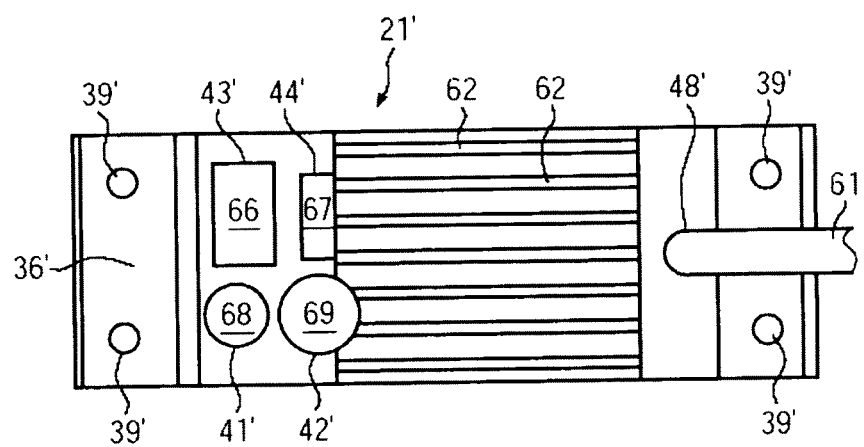
FIG. 10 is a schematic top view of the control module of FIG. 9.

FIG. 10 illustrates a bottom view of control module 21'. Cover 36' includes four holes 39' into which connecting elements 70 are inserted. At its end facing the steering tube, cover 36' is provided with a connection hole 48' through which a control line from control unit 60 reaches an operator module 20 arranged at the steering. Cover 36' preferably made of aluminum comprises a total of seven cooling fins 62 that are exposed to the airstream when the electric motorcycle 1 is running and thus provide for an improved cooling of control module 21'.

In order to avoid that humidity or dirt enter the receiving shafts 54a, 54b, 54c, all push-in openings 22, 23, 24 and connection holes 41-44, 41'-44', 48, 48' of the assembled electric motorcycle 1 are sealed in waterproof manner.

In an inventive method for mounting the electric motorcycle it is essential that seat tube 7, upper tube 11 and lower tube 12 can be filled-up with energy sources through resealable openings. Maintenance of the electric motorcycle or a replacement or the energy sources has thus become much easier. Lower tube 12 can be closed by means of a repeatedly demountable cover 36, 36' which simultaneously has a support function so as to strengthen lower tube 12 and serves as a carrier for control unit 60 and further components 61, 66, 67, 68, 69. Seat tube 7 preferably movably inserted is filled up with energy sources 55 through a push-in opening 23a simultaneously serving as receiving means for a saddle tube 9. To fill upper tube 11 with energy sources 55, a push-in opening 22 is provided that runs through said seat tube 7 and is closed, when the energy sources 55 are inserted, by means of a repeatedly mountable seal 27.

Modifications of the above-described embodiments may be possible within the range of the inventive idea. To make it easier to get on the electric motorcycle 1, upper tube 11 may be displaced towards lower tube 12. According to another preferred embodiment of the inventive electric motorcycle 1, a resilient rear wheel suspension 17 can be provided by pivotally connecting said rear wheel suspension 17, e.g. via a rotational axis located in the region of junction point 14, to said base frame 13, whereas a spring-damper-assembly group is provided between seat stays 16, 16' and seat tube 7 and/or upper tube 11.

A lateral surface opening 24, 65 with or without auxiliary frame 35 to accommodate a control module 21, 21' therein and/or to accommodate energy sources 55, 59 therein may alternatively or additionally also be provided in the upper tube 11 and/or the seat tube 7.

The invention claimed is:

1. A vehicle, comprising a frame, an electromotive drive for transmitting a driving torque to a wheel of the vehicle, and a control unit for controlling the electromotive drive, wherein said vehicle comprises an auxiliary pedal drive configured to transmit a driving torque to a wheel of the vehicle and said frame is shaped as a diamond frame with at least one upper tube, at least one lower tube and at least one seat tube, wherein said upper tube comprises a receiving shaft for at least one energy source and at least one tube end with a push-in opening through which said at least one energy source can be pushed into said receiving shaft, and wherein said upper tube continues at two opposite sides of said seat tube and wherein said receiving shaft runs through said seat tube.

2. The vehicle of claim 1, wherein said receiving shaft is a first receiving shaft and said seat tube comprises a second receiving shaft intersecting the first receiving shaft of said upper tube and at least one tube end with a push-in opening for accommodating at least one energy sources.

3. The vehicle of claim 1, wherein said seat tube comprises receiving means for a saddle tube and a receiving shaft of said seat tube continues into said saddle tube.

4. The vehicle of claim 1, wherein at least one of said seat tube or said lower tube further comprises a receiving shaft for at least one energy source, the receiving shaft having a substantially circular shaft cross-section, and the energy source having an outer contour adapted to said shaft cross-section and at least roughly circular in shape.

5. The vehicle of claim 1, wherein said lower tube comprises a lateral surface opening into which said control unit may be detachably inserted.

6. The vehicle of claim 5, wherein said lateral surface opening is bounded by a retaining frame that is arranged in a force flux, the force flux originating when the vehicle is running and passing through said lower tube.

7. The vehicle of claim 6, wherein said lateral surface opening is closed by a cover, wherein said cover is coupled to one of said upper tube, said lower tube and said seat tube via a first supporting surface and a second supporting surface, wherein the first and second supporting surfaces are configured to conduct at least a portion of the force flux therethrough.

8. The vehicle of claim 7, wherein said cover further comprises external cooling areas that are connected to said control unit through a thermal bridge.

9. The vehicle of claim 7, wherein said cover and said control unit form a control module that can be handled as one piece.

10. The vehicle of claim 5, wherein the at least one energy source can be inserted into said lower tube through said lateral surface opening.

11. A method for assembling at least one energy source into a vehicle comprising the steps of:
   providing a frame comprising at least an upper tube and a seat tube; and
   inserting at least one energy source into the frame, wherein the at least one energy source is inserted, through an open tube end of the upper tube, into said upper tube of said frame and wherein the at least one energy source is guided by a push-in opening of the upper tube which continues at two opposite sides of the seat tube of the frame; and
   wherein the frame further comprises a lower tube, and at least one of said upper tube, said seat tube, and said lower tube is being filled up with the at least one energy source through a lateral surface opening arranged between the ends of said tube.

12. The method of claim 11, wherein said seat tube is being filled with the at least one energy source through a receiving opening for receiving said saddle tube.

13. The method of claim 11 or 12, wherein a control unit is being inserted into the lateral surface opening of a frame tube and said opening is being closed by means of a cover, wherein a force flux may, at least partially, be conducted through said cover.

14. The method of claim 11, wherein the frame is shaped as a diamond frame.

* * * * *

UNITED STATES PATENT AND TRADEMARK OFFICE
CERTIFICATE OF CORRECTION

PATENT NO. : 8,657,055 B2  Page 1 of 1
APPLICATION NO. : 13/063544
DATED : February 25, 2014
INVENTOR(S) : Michael Hecken It is certified that error appears in the above-identified patent and that said Letters Patent is hereby corrected as shown below:

In the Specification
Column 2, Line 25, change "is provided at least" to --is provided at at least--
Column 2, Line 47, change "opening provided at least" to --opening provided at at least--

In the Claims
Column 12, Line 41, Claim 2, change "sources" to --source--
Column 12, Line 50, Claim 4, change "circular in shape" to --circular shape--

Signed and Sealed this
Seventh Day of October, 2014

Michelle K. Lee
*Deputy Director of the United States Patent and Trademark Office*